United States Patent
Sailhamer et al.

(10) Patent No.: US 10,830,302 B2
(45) Date of Patent: Nov. 10, 2020

(54) CONTINUOUS FRAMEWORK FOR SHOCK, VIBRATION AND THERMAL ISOLATION AND MOTION ACCOMMODATION

(71) Applicant: Hutchinson Aerospace & Industry, Inc., Hopkinton, MA (US)

(72) Inventors: John C. Sailhamer, Dedham, MA (US); Robert F. Sharp, Raleigh, NC (US); Thomas A. David, Grafton, MA (US); Gary J. Pivovarov, Boston, MA (US)

(73) Assignee: Hutchinson Aerospace & Industry, Inc., Hopkinton, MA (US)

(*) Notice: Subject to any disclaimer, the term of this patent is extended or adjusted under 35 U.S.C. 154(b) by 177 days.

(21) Appl. No.: 15/937,731

(22) Filed: Mar. 27, 2018

(65) Prior Publication Data
US 2018/0347656 A1  Dec. 6, 2018

Related U.S. Application Data

(60) Provisional application No. 62/477,133, filed on Mar. 27, 2017.

(51) Int. Cl.
| | |
|---|---|
| *G01C 19/5769* | (2012.01) |
| *F16F 7/108* | (2006.01) |
| *F16F 15/00* | (2006.01) |
| *F16F 15/04* | (2006.01) |

(52) U.S. Cl.
CPC ............ *F16F 7/108* (2013.01); *F16F 15/007* (2013.01); *F16F 15/04* (2013.01); *F16F 2228/04* (2013.01); *F16F 2228/06* (2013.01); *F16F 2230/0011* (2013.01); *F16F 2230/40* (2013.01); *F16F 2230/48* (2013.01)

(58) Field of Classification Search
CPC ..... G01C 19/02; F16D 65/122; F16D 65/125; F16D 65/127; F16D 65/128; G02B 7/08; G02B 7/09; G01P 15/0802; G01P 15/125
USPC .............. 33/1 M; 60/528; 361/277; 257/415; 188/378–380; 267/158–162
See application file for complete search history.

(56) References Cited

U.S. PATENT DOCUMENTS

| | | | | |
|---|---|---|---|---|
| 2,882,678 A | * | 4/1959 | Crownover | F16H 35/14 60/528 |
| 4,722,517 A | * | 2/1988 | Dijkstra | H04R 1/42 267/160 |
| 7,327,952 B2 | * | 2/2008 | Enomoto | G03B 5/00 33/1 M |
| 7,940,514 B2 | * | 5/2011 | Ikehashi | B81B 3/0072 361/277 |

(Continued)

*Primary Examiner* — Christopher P Schwartz
(74) *Attorney, Agent, or Firm* — Kuta IP Law, LLC; Christine M. Kuta (57) ABSTRACT

Vibration isolator systems have continuous frameworks wherein the frameworks are formed for specific applications. The continuous frameworks have linkages and voids formed and located such that frequency, direction and magnitude of vibrations are accounted for. The linkages and voids configuration provides elasticity and compliance such that a wide selection of materials is available for effective use. The continuous framework can be configured to include active elements such as a control circuit. The active elements may further include electric and magnetic field generators. Further, elastic and insulating materials can be easily added to the framework.

18 Claims, 11 Drawing Sheets

(56) References Cited

U.S. PATENT DOCUMENTS

| | | | |
|---|---|---|---|
| 8,262,051 B2 | 9/2012 | Vo et al. | |
| 8,338,896 B2 * | 12/2012 | Kanemoto | G01P 15/0802 |
| | | | 257/415 |
| 8,342,022 B2 * | 1/2013 | Schmid | G01C 19/5762 |
| | | | 73/504.12 |
| 8,413,509 B2 * | 4/2013 | Geisberger | G01P 15/125 |
| | | | 73/514.32 |
| 8,714,324 B2 * | 5/2014 | Shimoda | E04B 1/985 |
| | | | 188/379 |
| 8,789,416 B2 * | 7/2014 | Rocchi | G01C 19/5712 |
| | | | 73/504.12 |
| 2018/0342362 A1 * | 11/2018 | Koepsell | H01H 1/26 |

* cited by examiner

CONTINUOUS FRAMEWORK FOR SHOCK, VIBRATION AND THERMAL ISOLATION AND MOTION ACCOMMODATION

BACKGROUND

Vibration and shock isolation devices separate, disconnect or insulate an object such as a sensitive piece of electronics from a source of vibration or shock. Thermal isolation prevents thermal energy transfer. Electrical insulation helps to reduce electrical energy transfer. Isolation from undesirable transfer of mechanical, heat or electrical energy is generally desirable for protection of delicate or sensitive devices.

Vibration and shock isolation can be passive or active. Vibrations typically propagate via mechanical waves. Passive vibration isolation makes use of materials and mechanical linkages that absorb and damp these mechanical waves. Passive isolation is accomplished in some conventional devices with rubber pads or mechanical springs. Active vibration isolation involves the production of destructive interference that cancels out vibration. Active vibration isolation, sometimes referred to as "electronic force cancellation" conventionally uses electric power, sensors, actuators, and control systems.

Passive vibration isolation operates on the principle that every object on a flexible support has a fundamental natural frequency. When vibration is applied, energy is transferred most efficiently at the natural frequency, is transferred somewhat efficiently below the natural frequency, and with decreasing efficiency above the natural frequency. A passive isolation system typically includes a mass, a spring, and at least one damping element and generally moves as a harmonic oscillator. Vibrations are typically not completely eliminated, but can be greatly reduced, through the balance of stiffness and damping. The mass and spring stiffness determine the natural frequency of the system. Damping causes energy dissipation and has a secondary effect on natural frequency. Design for an effective isolation system for a particular application involves accounting for frequency, direction, and magnitude of vibrations present and determining the desired level of attenuation of those frequencies.

Active vibration isolation systems include, along with the spring, a feedback circuit. The feedback circuit typically includes a sensor such as a piezoelectric accelerometer, a controller, and an actuator. The acceleration signal from vibration is processed by a control circuit and amplifier. The electromagnetic actuator amplifies the signal. An active vibration isolation system typically provides stronger suppression of vibrations compared to ordinary damping. Active isolation is used, for example, for applications where structures smaller than a micrometer have to be produced or measured as in metrology, lithography and medical systems.

Vibration isolation systems may also be used for shock isolation and thermal and electrical isolation, and motion accommodation. Conventional systems typically have a number of parts requiring connection elements of some kind. This type of system is difficult to miniaturize. There are many materials limitations as well. For example, a material may have ideal structural properties and adequate thermal properties but no elasticity for damping.

In conventional elastomeric isolator devices, the elastomeric material often functions as both the mechanism for providing stiffness and as the mechanism for providing damping. Conventional elastomeric isolators generally have stiffness and damping properties that are approximately linear across their usable frequency range (typically 0 Hz to 4 kHz). Stiffness and damping properties, however, can vary significantly with temperature often to the detriment of effective vibration isolation.

The stiffness of the elastomeric material in the structure of the isolator is a factor in the effective function of the isolator or system of isolators. The stiffness of the isolator(s) paired with the mass of the supported equipment defines the natural frequency of the isolation system and so the frequency range where isolation occurs. The stiffness of elastomeric materials can be affected by environmental temperature conditions. At cold temperatures, most elastomers tend to stiffen thereby increasing the natural frequency of the isolator system and shifting the frequency range of isolation to higher frequencies. At warm temperatures, most elastomers tend to soften thereby decreasing the natural frequency of the isolator system and shifting the frequency range of isolation to lower frequencies.

The inherent damping properties of the elastomeric material are considerations in isolator applications as the damping reduces the amplification of the response at the frequencies around the natural frequency of the isolator or system of isolators. In turn, the damping has an inverse relationship with the effectiveness of the isolator at frequencies above the natural frequency of the system. The more damping an isolation system has, the smaller the response of the supported mass near or at the natural frequency and the less isolation the system provides above the natural frequency of the system. The damping of the elastomeric materials is affected by environmental temperature conditions. At cold temperatures most elastomers tend to experience increased damping properties thereby decreasing the system response at the natural frequency of the isolator system and decreasing the isolation efficiency in the frequency range of isolation. At warm temperatures, most elastomers tend to experience decreased damping properties thereby increasing the system response at the natural frequency of the isolator system and increasing the isolation efficiency in the frequency range of isolation.

It remains desirable to have to have an effective isolation system that operates effectively over a wide temperature range and that can be miniaturized and easily manufactured.

SUMMARY

The present invention is directed to a vibration isolator device that is a continuous framework wherein the framework is formed for the application and has linkages and voids formed and located in the framework such that frequency, direction and magnitude of the vibration are accounted for. Embodiments of the vibration isolator device are configured to operate well over a wider range of temperatures than conventional devices. The continuous structure can be simply manufactured. The continuous structure eliminates connective elements which also simplifies manufacture. The continuous framework with voids provides compliance and elasticity that provides compliance and elasticity to the framework so that a wider range of materials can be used for the vibration isolator device. Further, active elements can be added to the framework. Coatings providing greater damping and or insulating properties can be applied to the framework.

The present invention together with the above and other advantages may best be understood from the following detailed description of the embodiments of the invention illustrated in the drawings, wherein:

DESCRIPTION

A vibration isolator system has a continuous framework wherein the framework is formed for the application and has linkages and voids formed and located in the framework such that frequency, direction and magnitude of the vibration are accounted for. In the present application, continuous means that the structural elements and linkages in a framework are unbroken while the framework as a whole has spaces adjacent or between the structural elements and linkages. The spaces are also referred to as voids or openings. The framework configuration provides elasticity and compliance to materials that would otherwise be too stiff for effective damping. The framework can be configured to include active elements. Further, elastic and insulating materials can be easily added to the framework for example through coating.

The vibration isolator systems described herein use long slender beams to provide and define the stiffness of the isolator systems. Two factors define the stiffness of the systems—(1) the physical characteristics of the material or materials which make up the long slender beams and the surrounding structure, e.g. the attachment elements, and (2) the physical geometry of the long slender beams specifically, the length of the beam and the cross-sectional geometry. For simple long slender beams, the stiffness of each beam is driven by the length of the beam and the area moment of inertia defined by the cross-sectional area of the beam. In many applications, it is desirable to have equal stiffness in each orthogonal direction. To accomplish this, a uniform circular cross-section or square cross-section can be used. In other applications, stiffness in each direction is tailored to meet the needs of the isolation application. For example, ovular or rectangular cross-sections are used such that the area moment of inertia is different in each orthogonal direction. In general, the length to cross sectional area is defined by the application's isolator natural frequency requirements. High frequency applications may see a relationship of, for example, 50:1 (length to cross section area) while lower frequency applications may have, for example, a relationship of greater that 500:1.

Figure 1:
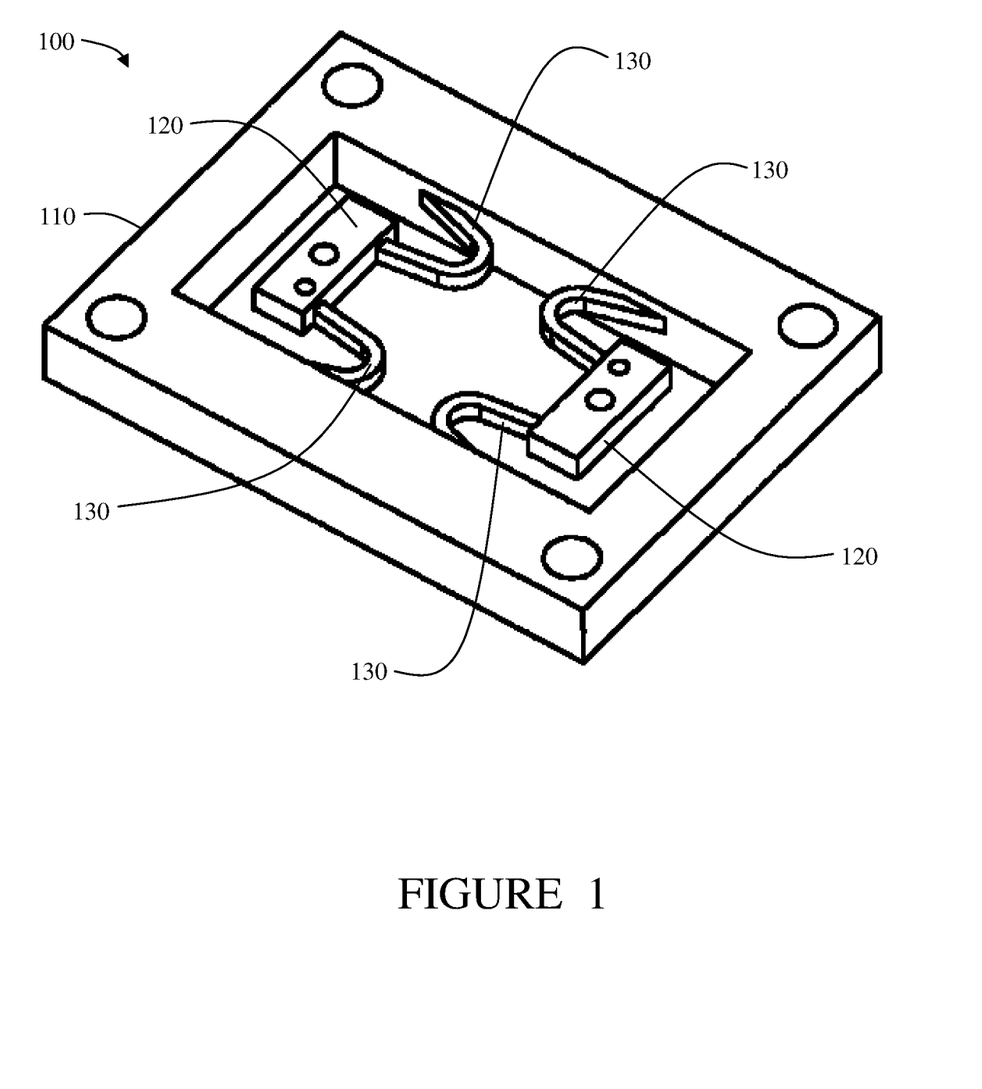
FIG. 1 is perspective view of a first vibration isolation device according to principles of the invention.

FIG. 1 shows a first embodiment of a vibration isolator system 100, also referred to as a "vibration isolator". The vibration isolation system 100 includes a base structure 110, also referred to as a first attachment element. The base structure 110 is adapted to couple to a source of vibration. The vibration system 100 further includes two isolated support structures 120, also referred to as second attachment elements. The support structures 120 are adapted to couple to an element to be isolated from the vibration from the vibration source. Disposed between the base structure 110 and the isolated support structures are a plurality of beams 130. The base structure 110 is configured to be a frame around the isolated support structures 120 and the beams 130. The beams are slender enough to be flexible. The base structure 110, support structures 120 and beams 130 form a unitary and continuous structure. The structure can also be described as contiguous. The continuous structure is formed and configured to respond to frequency, direction and magnitude of vibration from the vibration source.

Figure 2:
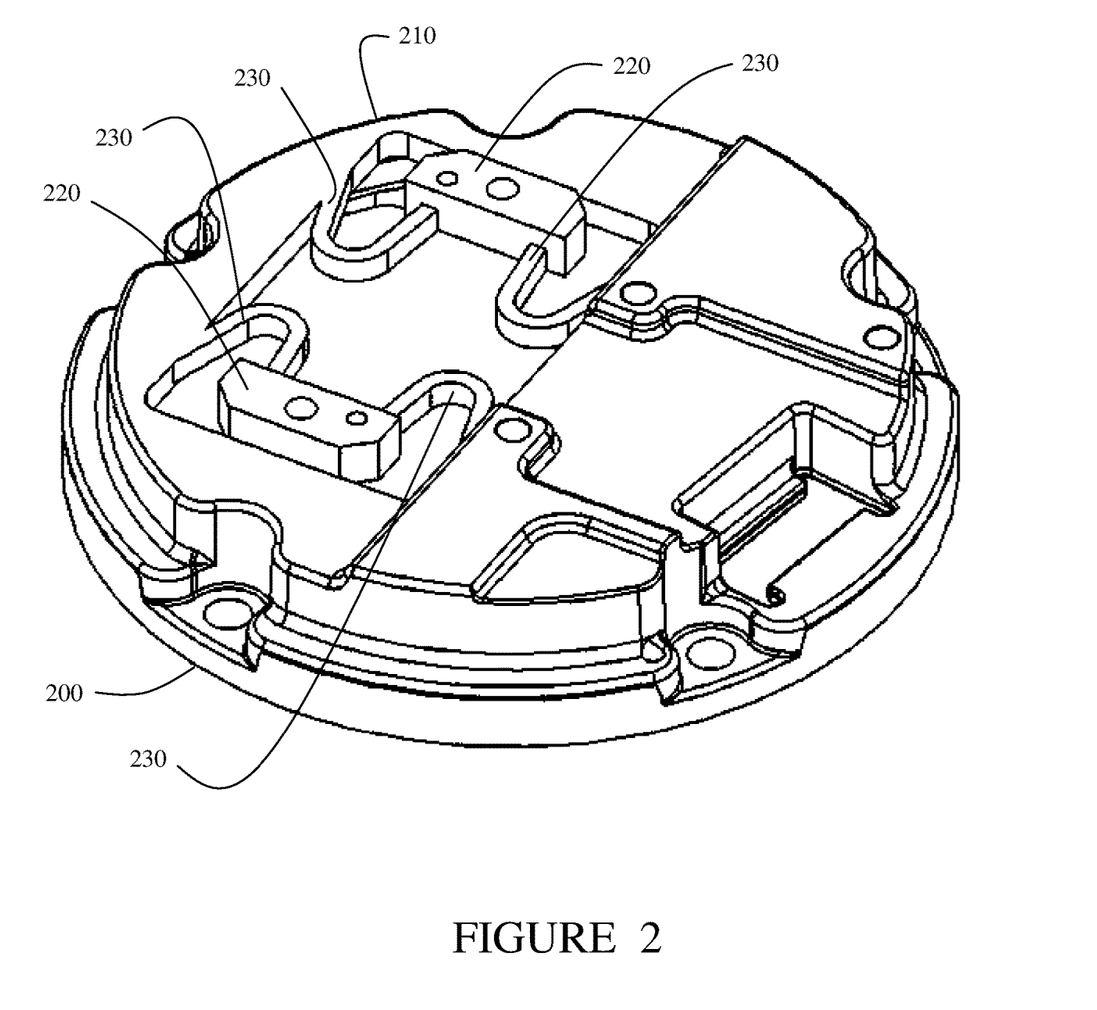
FIG. 2 is a perspective view of an alternative embodiment of a vibration isolation device integrated into a bulkhead.

FIG. 2 is perspective view of an alternative embodiment of a vibration isolator device. The vibration isolator elements of a first attachment element 210, second attachment elements 220 and beams 230 are integrated into a bulkhead 200.

Figure 3:
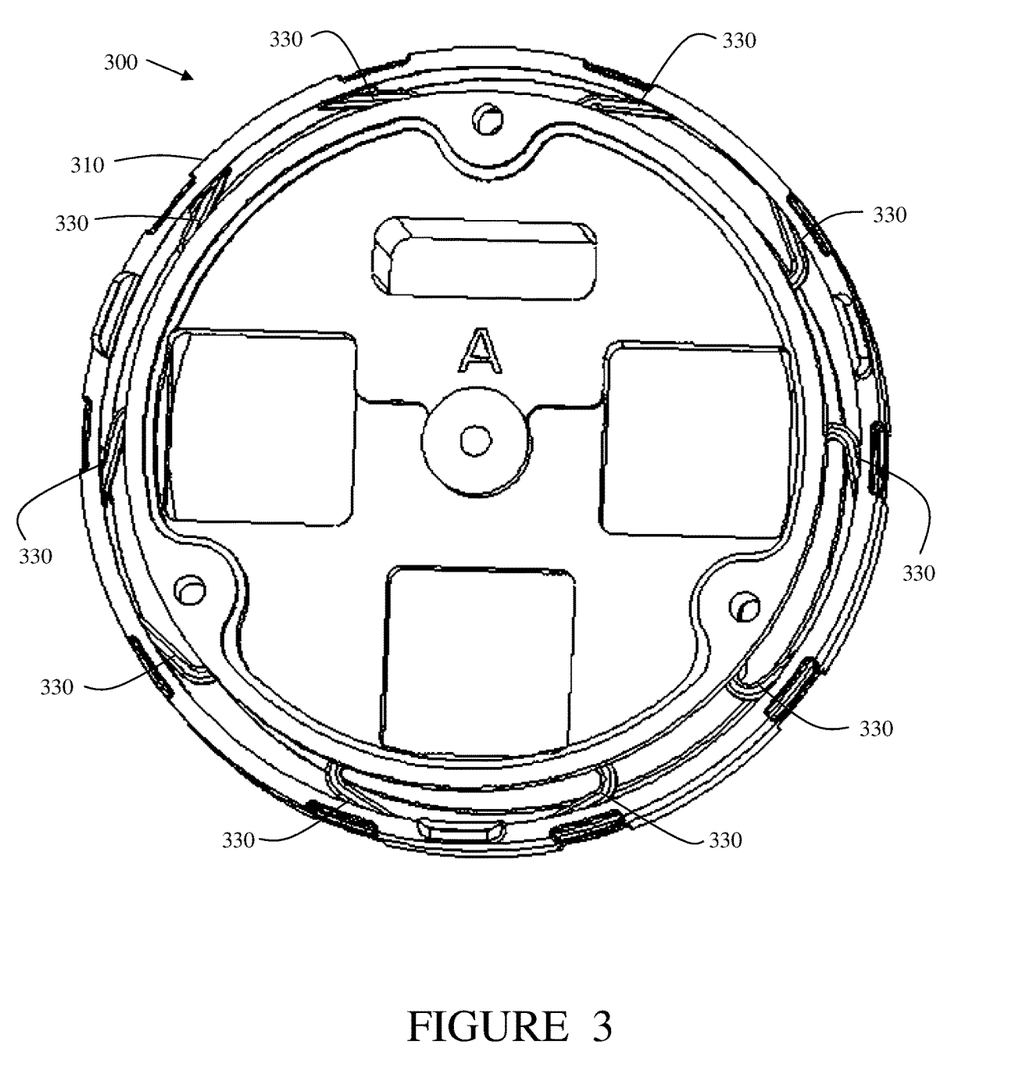
FIG. 3 is a top view of a further alternative embodiment of a vibration isolation device integrated into a structural seal.
Figure 4:
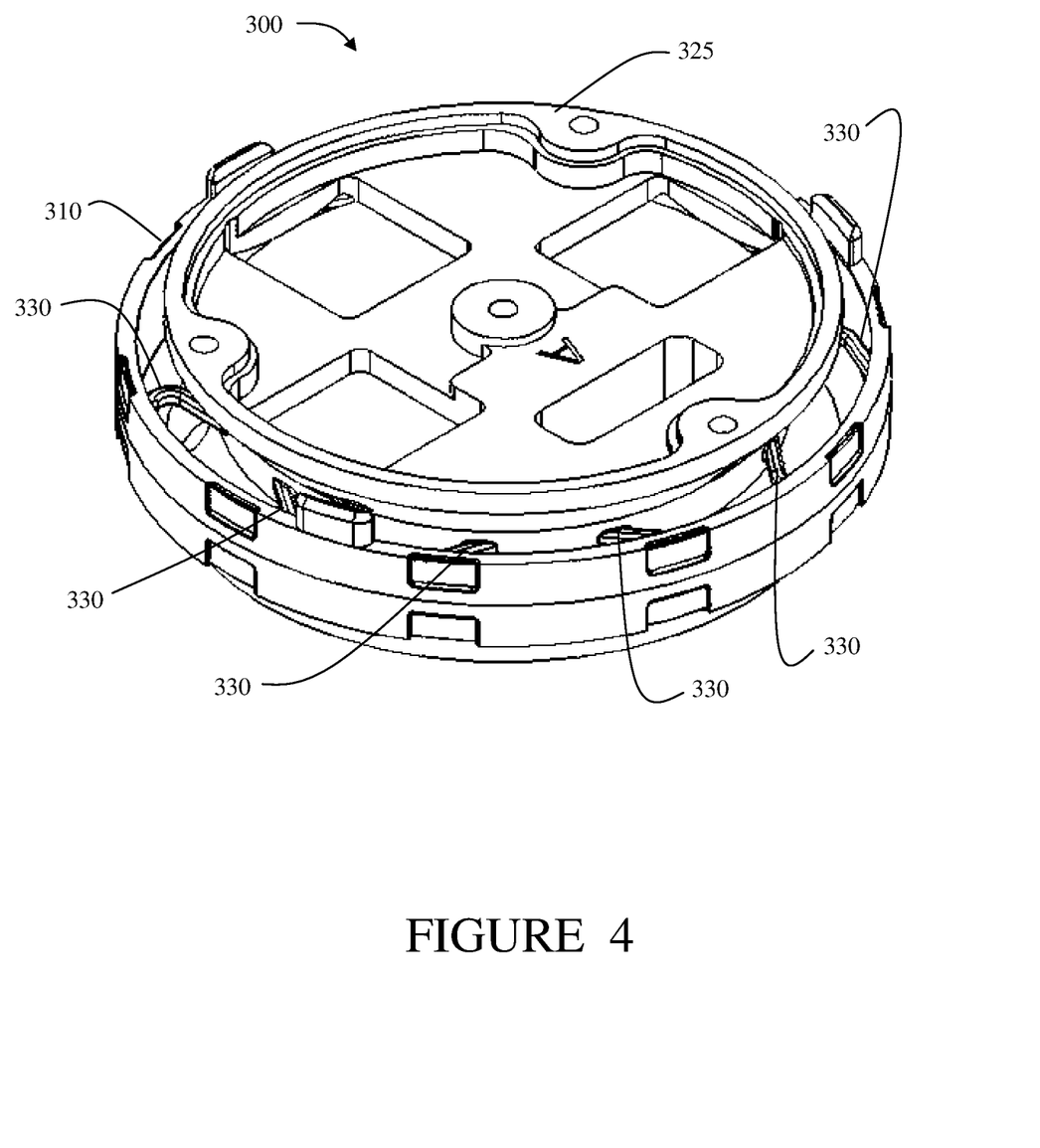
FIG. 4 is an isometric view of the structural seal of FIG. 3.

FIG. 3 is a top view of a structural seal 300 including another embodiment of a vibration isolator device. FIG. 4 is a perspective view of the structural seal 300. The structural seal 300 has a base element 310 and a cover 325. A plurality of beams 330 is visible. The beams 330 are coupled to the base 310. The beams are also coupled to support structures (not shown) attached to the underside of the cover 325.

Figure 5:
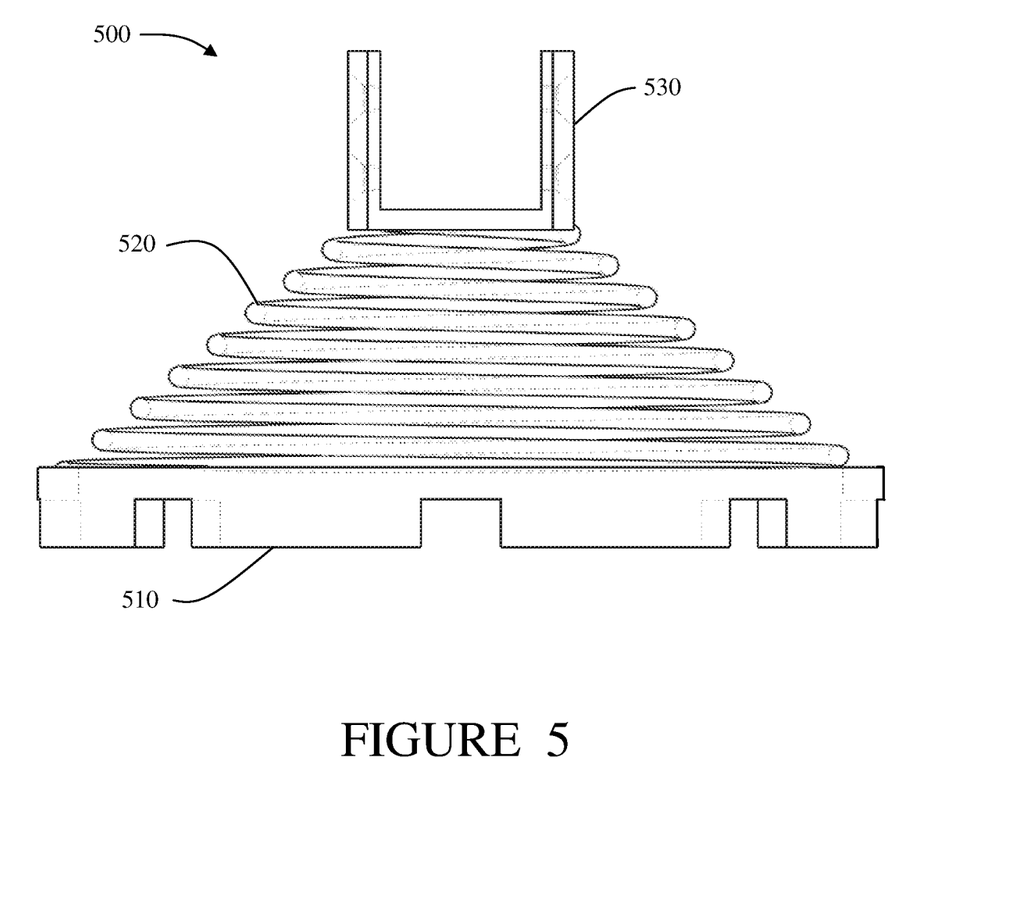
FIG. 5 is a side view of a further alternative embodiment of a vibration isolation system according to principles of the invention.

FIG. 5 is a side view of another embodiment of a vibration isolator 500 according to the present invention. The vibration isolator 500 has a base 510, or first attachment element, adapted to couple to a vibration source. The vibration isolator 500 has a support structure 530, or second attachment element, adapted to couple to an element to be isolated from vibration. A flexible beam 520 is attached to the base 510 and to the support structure 530. The flexible beam 520 is coiled in a substantially conical shape having a larger diameter where the beam 520 meets the base 510 and a smaller diameter where the beam meets the support structure 530. The base 510, beam 520 and support structure 530 form are contiguous, forming a single continuous structure that is formed and configured to respond to the frequency, direction and magnitude of vibration from the vibration source. The structure is formed as one piece without attachment elements between the base 500 and the beam 520 or between the support structure and the beam 500.

Figure 6:
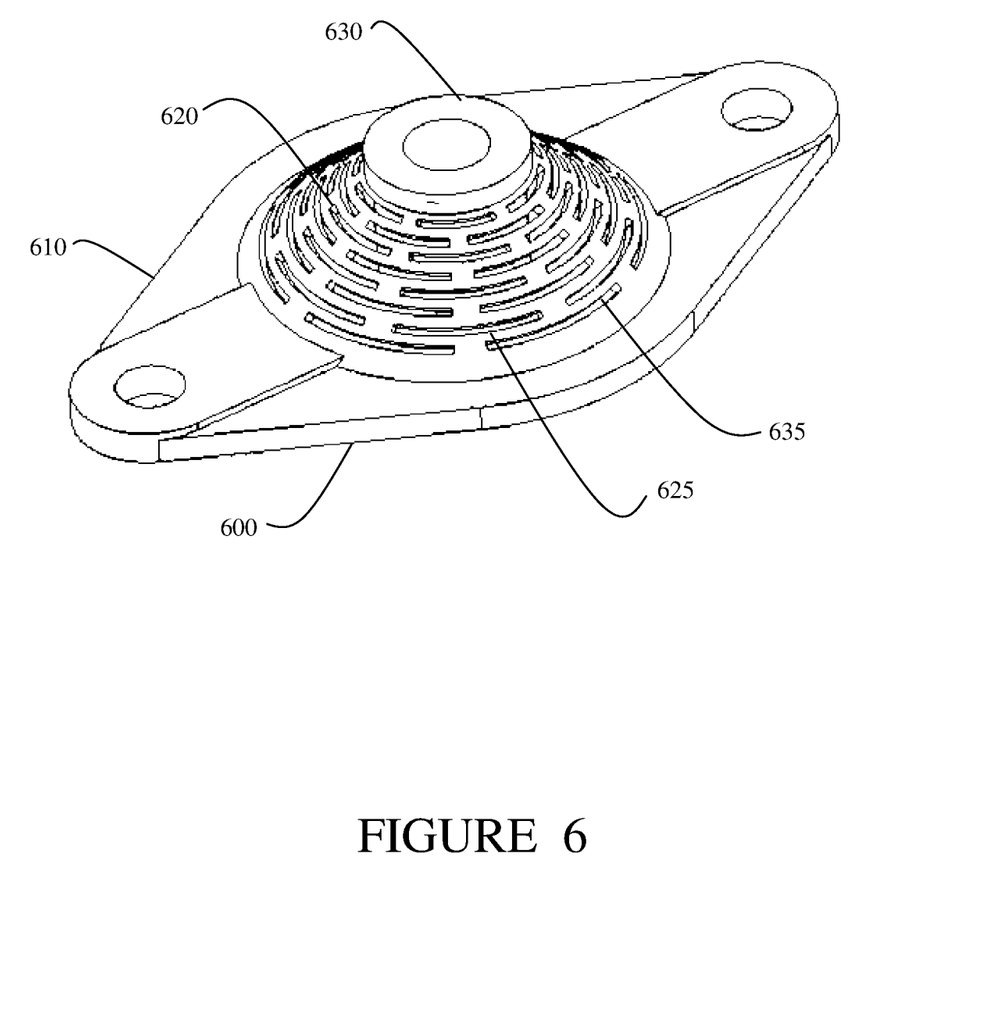
FIG. 6 is a perspective view of another alternative embodiment of a vibration isolation system according to principles of the invention.

FIG. 6 is a perspective view of another alternative embodiment of a vibration isolation system 600. The vibration isolation system 600 includes a base 610 and a support element 630. A framework 620 that is substantially conical in shape is disposed between the base 610 and support element 630. The frame 620 has a plurality of voids 635. The voids 635 are shaped and located in such as way as to form a plurality of flexible beams 625. The voids 635 further are located and configured to enable the beams 625 to flex in response to the vibration from a source.

Figure 7:
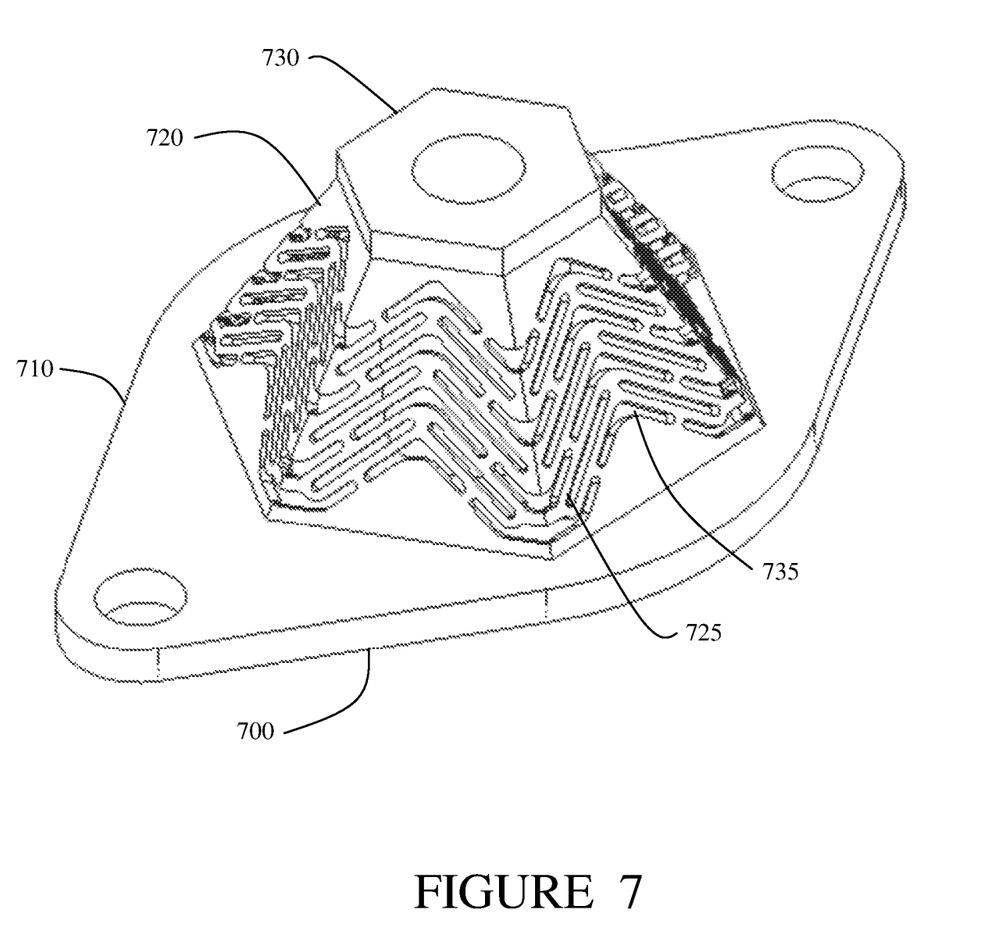
FIG. 7 is a perspective view of another alternative embodiment of a vibration isolation system according to principles of the invention.

FIG. 7 is a perspective view of another alternative embodiment of a vibration isolation system 700. The vibration isolation system 700 includes a base 710 and a support element 730. A framework 720 that is substantially a hexagonal pyramid in shape is disposed between the base 710 and support element 730. The frame 720 has a plurality of voids 735. The voids 735 are shaped and located in such as way as to form a plurality of flexible beams 725.

Vibration Isolator Applications with No External Damping Elements

Isolator systems according to the present invention can be designed with a wide variety of materials. The stiffness of the isolation system is primarily the function of the elastic modulus of the material and the geometry of the long slender beams used to make up the unified framework of supports. The damping of a vibration isolator structure application with no external damping elements is simply defined by the system damping characteristics of the material and the defined geometry that comprise the base support, longer slender beams and isolated support structures. For some applications, system requirements for damping are small, undefined or performance is unaffected by damping levels. In these cases, as well as in cases where material properties provide sufficient damping, external damping elements are not required.

Vibration Isolator Application with External Damping Elements

Vibration isolator systems are often designed with materials (such as aluminum, titanium, steel, composites, etc.) that have damping properties that are not typically useful in isolator applications. Damping elements are advantageously added to the design of an isolator to increase the damping. This can be done by over molding the structure with inherently damped materials (typically elastomeric materials such as but not limited to silicone, natural rubber, neoprene, or various polyurethanes), creation of elastomeric webbing, adhering constrained layer damping (thin layer of viscoelastic material with a constraining layer), or by the application of smart elements such as piezo-electric actuators.

The main difference and benefit of the present invention is that the stiffness and damping mechanisms are effectively separated. In the design of isolator systems, the damping effects can be achieved through the use of one or more of the above mentioned damping mechanisms while the stiffness of the system is driven primarily by the design of the long slender beams. The damping mechanisms have little effect on the system stiffness conversely the long slender beams typically contribute only a small amount to the overall system damping properties.

Vibration Isolators with Constrained Layer Damping

One method of increasing damping in a vibration isolator system of the present invention is to use constrained layer damping. In a constrained layer damping application, a thin film of viscoelastic (rubber, silicone, foams, etc.) material is adhered to the long slender beams along with a thin sheet of constraining material (typically steel, aluminum or composite material). When the long slender beams bend under vibratory load, the viscoelastic material is strained in the shear direction causing the viscoelastic material to turn mechanical energy into heat energy thereby damping the structural components and the isolation system as a whole. For greatest efficiency, application of the constrained layer damping mechanism should be concentrated at the locations where material strains are highest.

Benefits of using constrained layer damping in vibration isolator systems of the present invention are as follows. The constrained layer damping allows the use of materials with interesting damping properties that typically cannot be used in elastomeric isolation system designs due to ultimate strength, bonding characteristics, material modulus or other physical characteristics. The constrained layer damping also allows the use of elastomeric materials with low modulus properties containing less fillers or additives thereby reducing impacts of environmental temperature conditions on damping and residual stiffness. Separation of the damping and stiffness mechanisms ensures minimal natural frequency variation over a wide temperature range.

Vibration Isolators with Over Molded Elastomer

Figure 8:
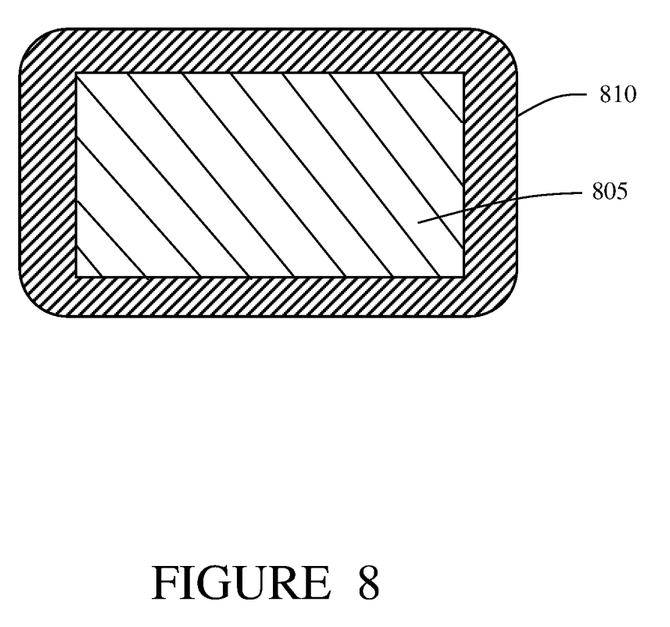
FIG. 8 is a cross-section view of a beam having an outer layer of elastomer according to principles of the invention.

One method of increasing damping in the isolator system of the present invention is to over mold the structure with elastomers such as (but not limited to) silicone, natural rubber, neoprene, polyurethanes or other moldable materials with varying damping properties. In an over molded application, a thin layer of elastomeric material is molded to the long slender beams and/or surrounding structure or supports. A cross-sectional view of a beam 805 having an outer layer of elastomer 810 is shown in FIG. 8. The proportions of the beam and layer of elastomer in FIG. 8 are not to scale in order for reasons of clarity of exposition. When the long slender beams bend under vibratory load, the viscoelastic material is strained in tension causing the viscoelastic material to turn mechanical energy into heat energy thereby damping the structural components and the isolation system as a whole. Application of the over molded elastomer damping mechanism is typically but not necessarily applied over the entirety of the long slender beams and beyond to the two support sides (base and response). Care should be taken to understand the stiffness effects of any elastomer purposefully left in the structural voids.

Benefits of using over molded elastomers in isolator systems of the present invention are as follows. Over molded elastomers allow the use of materials with interesting damping properties that typically cannot be used in elastomeric isolation system designs due to ultimate strength, bonding characteristics, material modulus or other physical characteristics. Over molded elastomers further allow the use of elastomeric materials with low modulus properties containing less fillers or additives thereby reducing impacts of environmental temperature conditions on damping and residual stiffness. Separation of the damping and stiffness mechanisms ensures minimal natural frequency variation over a wide temperature range. Over molding the structure with elastomer provides a geometrically positive capture and constraint of the elastomeric material thereby reducing the importance of the bond strength in the design and reducing the risk of foreign object debris (FOD) in the application.

Vibration Isolators with Webbed Elastomeric Elements

Figure 11:
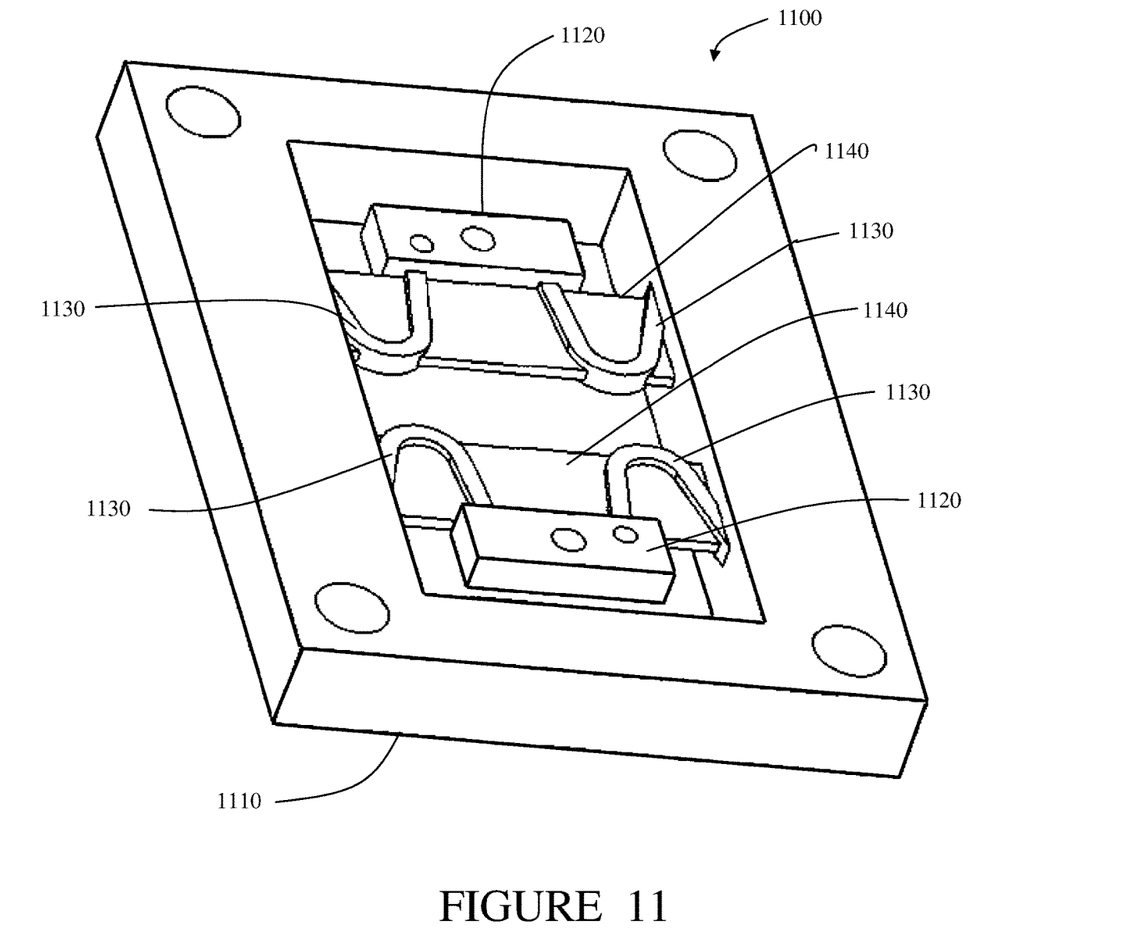
FIG. 11 is a perspective view of another alternative embodiment of a vibration isolation system according to principles of the invention.

One method of increasing damping in isolator systems of the present invention is to mold thin layers of elastomer between the two support sides (base and response). FIG. 11 shows an alternative embodiment of a vibration isolator system 1100, also referred to as a "vibration isolator". The vibration isolation system 1100 includes a base structure 1110, also referred to as a first attachment element. The base structure 1110 is adapted to couple to a source of vibration. The vibration isolation system 1100 further includes two isolated support structures 1120, also referred to as second attachment elements. The support structures 1120 are adapted to couple to an element to be isolated from the vibration from the vibration source. Disposed between the base structure 1110 and the isolated support structures are a plurality of beams 1130. The base structure 1110 is configured to be a frame around the isolated support structures 1120 and the beams 1130. The beams are slender enough to be flexible. The base structure 1110, support structures 1120 and beams 1130 form a unitary and continuous structure. The structure can also be described as contiguous. The continuous structure is formed and configured to respond to frequency, direction and magnitude of vibration from the vibration source. The vibration isolation system 1100 further includes layers of elastomer 1140 between two sides of the base 1110, filling in the bowed areas of the beams 1130 and the areas between the beams adjacent to the support structures 1120. In an alternative arrangement, the layers of elastomer also fill in the remaining areas around the support structures 1120.

As the isolator system is subjected to vibratory loads, the displacement between the base and response sides of isolator system causes the viscoelastic material to be strained in tension causing the viscoelastic material to turn mechanical energy into heat energy thereby damping the structural components and the isolation system as a whole. Care must be taken in the design of the webbed elastomeric damping element to understand the damping elements effect on the stiffness of the isolator system.

Benefits of using webbed elastomer features are as follows. The webbed elastomer allows the use of materials with interesting damping properties that typically cannot be used in elastomeric isolation system designs due to ultimate strength, bonding characteristics, material modulus or other physical characteristics. The webbed elastomer further allows the use of elastomeric materials with low modulus properties containing less fillers or additives thereby reducing impacts of environmental temperature conditions on damping and residual stiffness. Separation of the damping and stiffness mechanisms ensures minimal natural frequency variation over a wide temperature range. The webbed elastomer reduces the complexity of the tooling required to manufacture the isolators. Further, the webbed elastomer increases the efficiency of the system by decreasing the amount of elastomeric material required to provide sufficient damping.

Vibration Isolators with Piezo-Electric Damping

Figure 9:
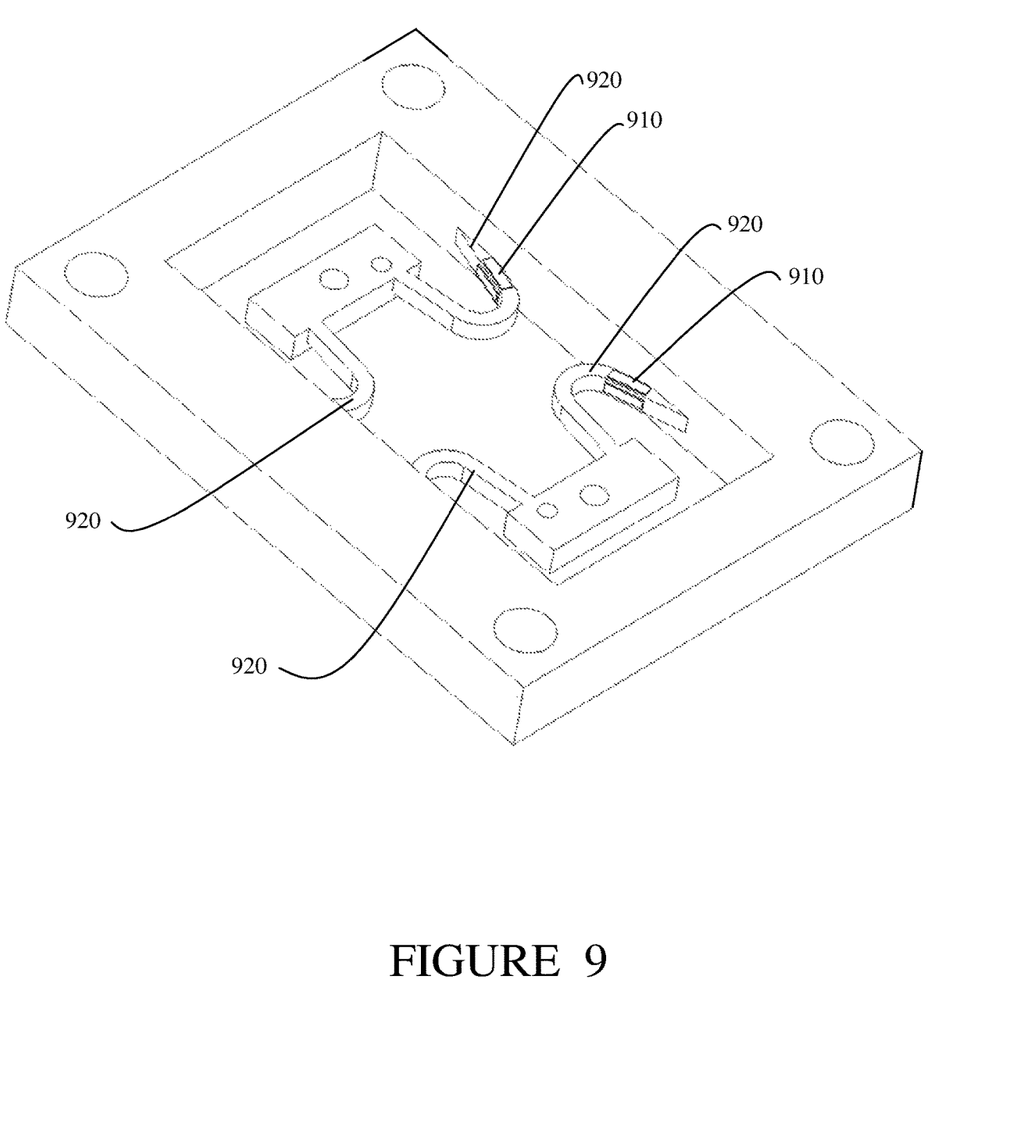
FIG. 9 is a perspective of a vibration isolation system having active elements according to principles of the invention.
Figure 10:
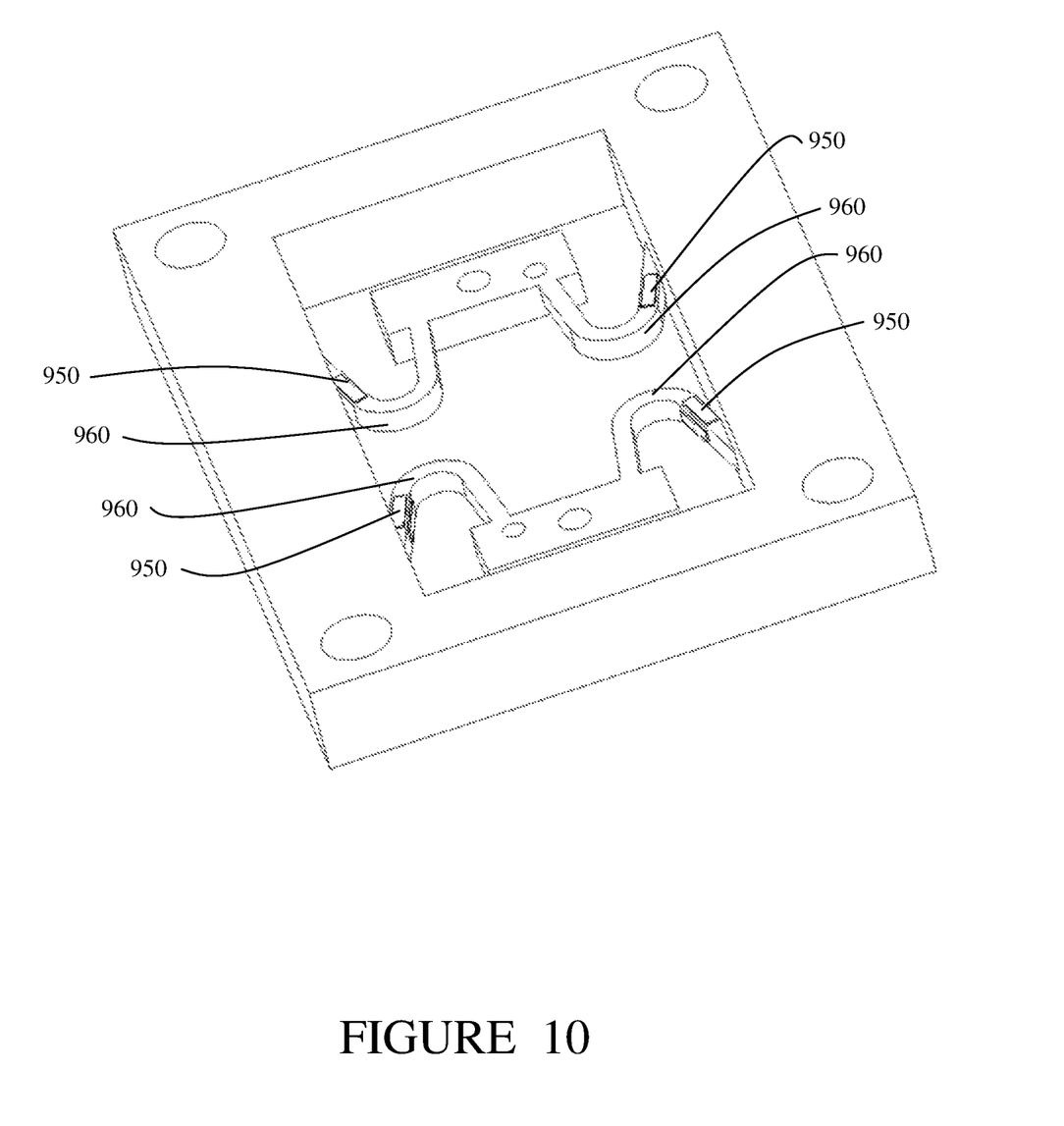
FIG. 10 is a perspective view of the vibration isolation system of FIG. 9 showing an alternative arrangement of active elements.

One method of increasing damping in vibration isolator systems of the present invention is to apply piezo-electric bending actuators 910, 950 to the long slender beams 920, 960 as shown in FIGS. 9 and 10. Piezo-electric bending actuators can be charged through an electrical control system causing the actuators to bend. Conversely, when the piezo-electric bending actuators are bent they provide an electrical voltage. In this damping application, Piezo-electric bending actuators can be applied directly to the long slender beams with primary focus on areas of the greatest strain. Under a vibratory load, the long slender beams bend in turn bending the actuators. The electrical power created by the actuators due to bending of the long slender can be captured and dissipated using an RLC circuit (R-Resistance, L-Inductance, C-Capacitance). By adjusting the components of the circuit, this damping application can be tuned to function in a non-linear fashion across the usable frequency range.

The benefits of piezo-electric damping are as follows. Piezo-electric damping can be tuned to desired levels at very specific frequency ranges based on the needs of the application. The frequency range of damping can be adjusted allowing the vibration isolation system to achieve very low amplification levels at the system natural frequency while achieving very high isolation levels at frequencies above the natural frequency. Damping can be turned on or off based on the needs of the application allowing for multi-mode performance. Separation of the damping and stiffness mechanisms ensures minimal natural frequency variation over a wide temperature range.

Embodiments of the present invention provide shock and vibration isolation response to a wide variety of vibration situations effective over a wide range of temperature. The beams and frameworks disclosed herein can be configured to act as thermal isolators, a thermal conductors, or as an electrical insulator or a ground as well as provide vibration isolation.

Further alternative embodiments include a continuous structural framework having mounting surfaces that provide vibration and shock isolation between the mounting surfaces of an inertial measurement sensor suite or system and another surface of the framework. The framework is a single continuous object made as a single part. The linkages of the structural framework are composed of a continuous amalgamation of different materials that can be passive or active. The materials are chosen by the designer such that the framework has the desired damping and spring properties that include linear damping and frequency response in the desired performance regions. Further, the materials possess thermal properties to act as either a conductor or insulator. In addition, the materials may be selected to include certain electrical properties to act as either a conductor/ground or as an insulator. In an alternative configuration, the material has properties that are set at manufacture for specific temperature thresholds, shock thresholds, and vibration frequency. In another alternative configuration, the linkages are formed and configured such that the material properties can be continuously varied for a desired effect by the presence or absence of a continuous or alternating magnetic or electric field or electric current. The framework's damping and spring properties are designed to align with a reference basis frame. The reference basis frame may be defined by spherical coordinates, cylindrical coordinates, a three dimensional Euclidian or a non-Euclidian basis set.

In another alternative embodiment, a structural framework has mounting surfaces that provide vibration and shock isolation between the mounting surfaces of, for example, an imaging system, an interferometer, a spectrometer, a LIDAR, or RADAR. The structural framework operates at any frequency band in the electromagnetic spectrum. The framework is a single continuous object made as a single part. The linkages of the structural framework are composed of a continuous amalgamation of different materials chosen by the designer such that the framework has the desired properties. The desired properties include damping and spring properties that include linear damping and frequency response in selected performance regions. The desired properties further include thermal properties to act as either a conductor or insulator. The desired properties may further include electrical properties to act as either a conductor/ground or insulator. The material properties can be set at manufacture for specific temperature thresholds, shock thresholds, and vibration frequency. The framework's damping and spring properties are designed to align with a reference basis frame. The reference basis frame may be defined by spherical coordinates, cylindrical coordinates, a three dimensional Euclidian or a non-Euclidian basis set.

In a further alternative embodiment, a structural framework has mounting surfaces that provide vibration and shock isolation between the mounting surfaces of a pointing system and another surface of the framework. The framework is a single continuous object made as a single part. The linkages of the structural framework are composed of a continuous amalgamation of different materials chosen by the designer such that the framework has the desired damping and spring properties. The damping and spring properties include linear damping and frequency response in selected performance regions. The selected properties may further include thermal properties to act as either a conductor or insulator. The selected properties may further include electrical properties to act as either a conductor/ground or insulator. The framework's damping and spring properties are designed to align with a reference basis frame. The reference basis frame may be defined by spherical coordinates, cylindrical coordinates, a three dimensional Euclidian or a non-Euclidian basis set.

In alternate arrangements of the three embodiments described immediately above, an electronic control circuit and software apply specific electric current through the structural elements. The electric current changes the electrical conductivity, thermal conductivity, spring and damping properties of the structure to allow the frame work to actively control the temperature, vibration frequency and amplitude, rotational frequency and amplitude of the mounting surfaces.

In further alternative arrangements of the three embodiments described above, an electronic control circuit and software and electric field generators apply specific electric fields around the structural elements. The electric fields alter, in a desired and controlled way, the electrical conductivity, thermal conductivity, spring and damping properties of the structure to allow the framework to actively control the temperature, vibration frequency and amplitude, rotational frequency and amplitude of the mounting surfaces.

In still further alternative arrangements of the three embodiments described above, an electronic control circuit, software and magnetic field generators apply specific magnetic fields around the structural elements. The magnetic fields change, in a desired and controlled way, the electrical conductivity, thermal conductivity, spring and damping properties of the structure to allow the framework to actively control the temperature, vibration frequency and amplitude, rotational frequency and amplitude of the mounting surfaces.

In an even further alternative arrangement of the embodiments and arrangements described above, an electronic control circuit, software and electric and magnetic field generators operate together or independently to provide active control of the temperature, vibration frequency and amplitude, rotational frequency and amplitude of the mounting surfaces.

The vibration isolator systems described above have the advantage of a continuous structure that simplifies manufacture and miniaturization. The linkages and voids of continuous structure make possible complex designs that respond better than the multiple-piece conventional vibration isolation devices. Further, the linkages and voids design enable a broader set of materials to be used for building the framework. In addition, the framework can easily accommodate coatings and other additional materials. Circuits and software can be easily applied to enhance the desired properties of the vibration isolator system.

It is to be understood that the above-identified embodiments are simply illustrative of the principles of the invention. Various and other modifications and changes may be made by those skilled in the art which will embody the principles of the invention and fall within the spirit and scope thereof.

We claim:

1. A vibration isolator, comprising:
a first attachment element adapted to couple to a vibration source;
a second attachment element adapted to couple to an element to be isolated;
a flexible beam disposed between the first attachment element and the second attachment element,
wherein the first attachment element, second attachment element and beam form a contiguous structure, the contiguous structure formed and configured to respond to frequency, direction and magnitude of vibration from the vibration source.

2. The vibration isolator of claim 1 further comprising a plurality of flexible beams disposed between the first attachment element and second attachment element.

3. The vibration isolator of claim 2 further comprising a plurality of second attachment elements wherein the first attachment element is a frame surrounding the plurality of beams and second attachment elements.

4. The vibration isolator of claim 3 wherein each beam in the plurality of beams is formed from a nonelastomeric material.

5. The vibration isolator of claim 4 wherein each beam in the plurality of beams further comprises an outer layer of elastomer.

6. The vibration isolator of claim 3 further comprising a plurality of active elements.

7. The vibration isolator of claim 3 wherein the beams have bends, and further comprising layers of elastomer located in spaces between the beams and the frame and inside the bends of the beams.

8. The vibration isolator of claim 3 further comprising layers of elastomer located in spaces between the second attachment elements and the frame.

9. The vibration isolator of claim 1 further comprising a plurality of beams arranged to form a framework, wherein the beams of the plurality are arranged such that the framework is flexible and wherein the first attachment element, second attachment element and framework form a contiguous structure, the contiguous structure formed and configured to respond to frequency, direction and magnitude of vibration from the vibration source.

10. The vibration isolator of claim 9 wherein the framework is pyramid-shaped.

11. The vibration isolator of claim 9 wherein the voids are shaped and configured to enable beam flexure.

12. The vibration isolator of claim 9 wherein the framework is conical in shape.

13. The vibration isolator of claim 1 wherein the flexible beam is formed from a nonelastomeric material.

14. The vibration isolator of claim 13 wherein the flexible beam further comprises an outer layer of elastomer.

15. The vibration isolator of claim 14 wherein the outer layer of elastomer is formed by overmolding.

16. The vibration isolator of claim 1 wherein the beam further comprises an active element.

17. The vibration isolator of claim 16 wherein the active element further comprises a piezo-electric bending actuator.

18. The vibration isolator of claim 1 wherein spaces between the beam and the first attachment element and between the beam and the second attachment element include layers of elastomer.

* * * * *